UNITED STATES PATENT OFFICE.

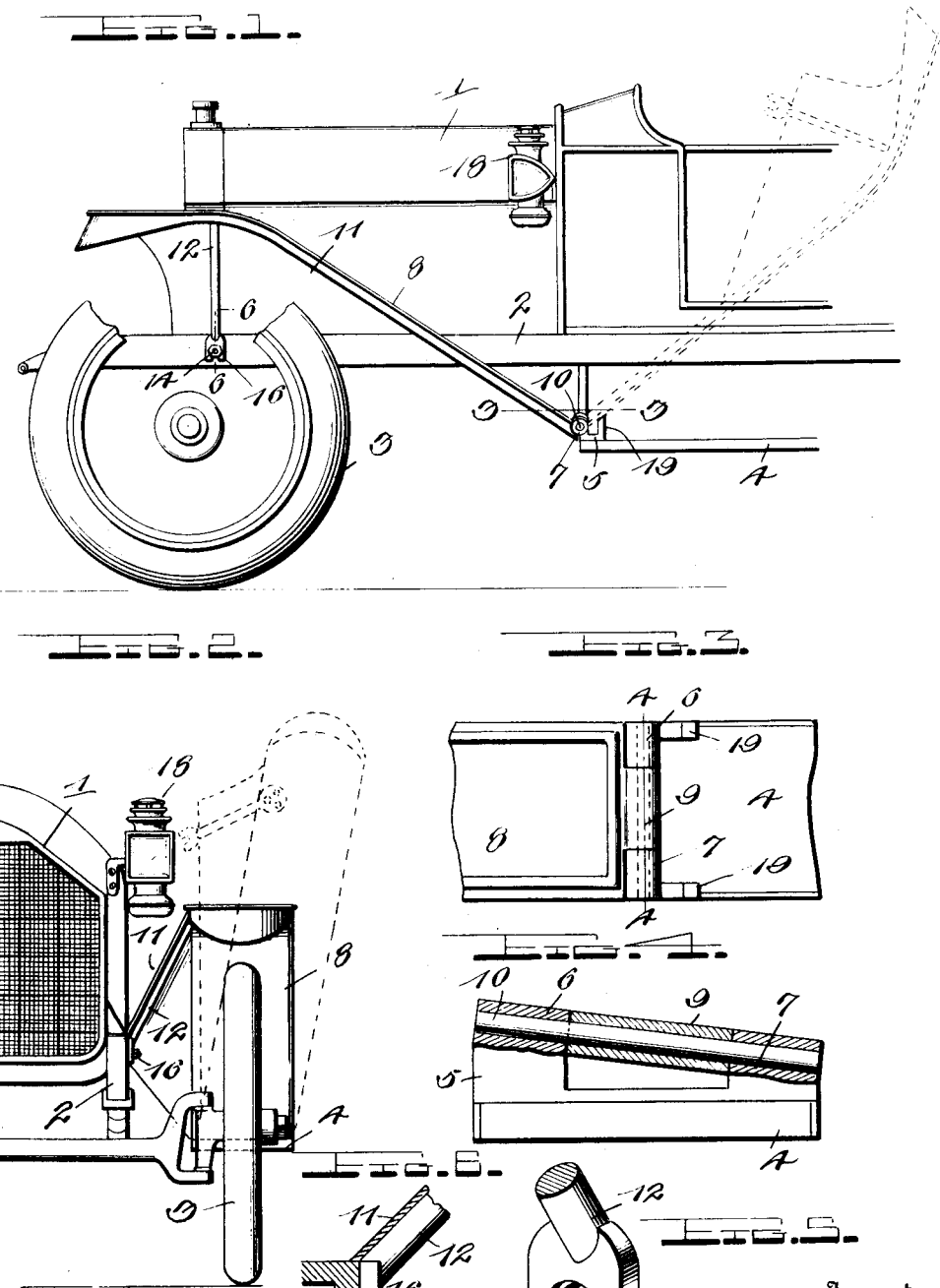

OLIVER W. PATTERSON, OF CHICOPEE FALLS, MASSACHUSETTS.

MUD-GUARD FOR AUTOMOBILES.

1,052,511.  Specification of Letters Patent.  Patented Feb. 11, 1913.

Application filed February 12, 1912. Serial No. 677,092.

*To all whom it may concern:*

Be it known that I, OLIVER W. PATTERSON, a citizen of the United States, residing at Chicopee Falls, in the county of Hampden and State of Massachusetts, have invented certain new and useful Improvements in Mud-Guards for Automobiles, of which the following is a specification, reference being had to the accompanying drawings.
This invention relates to new and useful improvements in mud guards particularly adapted for use on automobiles and my object is to provide a device of this character which is movably mounted on a vehicle to permit access to various parts of the machine adjacent the guard.

A further object of the invention resides in providing a mud guard which is hingedly mounted on the running board of a vehicle and a still further object resides in the provision of such means as will dispose the guard outwardly and clear of the side lamps of the vehicle when said guard is raised.

Still another object of the invention resides in providing a hinge for the guard, the axis of which is inclined upwardly at an angle to the horizontal plane of the running board upon which the same is mounted, and a still further object resides in providing supporting means for the guard in both its raised and lowered positions.

With these and other objects in view, my invention consists in the novel features of construction, combination and arrangement of parts hereinafter referred to and more particularly pointed out in the specification and claims.

In the accompanying drawings forming a part of this application, Figure 1 is a fragmentary side elevation of a vehicle, showing my improved guard applied to use thereon; Fig. 2 is a fragmentary front elevation of the vehicle with the device applied showing in dotted lines the position of the guard when raised; Fig. 3 is a section as seen on the line 3—3 of Fig. 1; Fig. 4 is a section as seen on the line 4—4 of Fig. 3; Fig. 5 is a fragmentary perspective view of the supporting member for the guard when in its lowered position; and Fig. 6 is a section as seen on the line 6—6 of Fig. 1.

In carrying out my invention, I shall refer to the drawing, in which similar reference characters designate corresponding parts throughout the several views and in which 1 indicates the hood of an automobile body mounted upon the frame 2 which is, in turn, supported by means of the wheels 3 and suspended in the usual manner from said frame
1, is a running board 4. Secured to the forward end of said running board is the one portion 5 of the hinge, the socket portions 6 and 7 thereof being disposed at an angle upwardly from their outer to their inner ends to the horizontal plane of said running board and a mud guard or fender 8 of the usual type carried on automobiles, has the inner or lower end thereof provided with the opposed socket portion 9 of the hinge.

This mud guard 8 is adapted to be positioned with respect to the running board 4 so that the socket portion 9 will be interposed between the socket portions 6 and 7 of the opposed portion of the hinge and a pin or bolt 10 extending through the sockets 6, 7 and 9 will securely retain the mud guard to the running board and provide a hinged connection therebetween. In order to support the forward end of the mud guard when in its lowered or effective position, the apron 11 thereof which is inclined inwardly from its upper to its lower edges, as usual, has secured thereto a metallic bracing strip or bar 12. The lower end of this bracing strip is bent slightly at an angle to the general trend thereof and bifurcated, as shown at 13 to receive therein a bolt or the like 14 carried on the frame 2. The outer face of the lower end of said strip 12 has the portion surrounding the slot therein counter-sunk as shown at 15 and a nut 16 engaged with the free end of said bolt 14 has a neck or collar portion 17 thereon whereby when said bifurcated end of the strip 12 is engaged with the bolt 14, said nut may be turned to bind against said strip and allow the collar or neck portion 17 thereof to fit within the counter-sunk portion 15 of said strip 12. The mud guard will then be securely supported in position and prevented from rattling or casual disengagement through jolting incident to the movement of the vehicle.

From the above description of the construction of my device, it will be seen that whenever it is desired to work upon the engine, the bracing strip 12 may be disengaged and the entire mud guard raised, as shown in dotted lines in Figs. 1 and 2 and in view of the particular disposition of the sections of the hinge at an angle to the horizontal plane of the running board, it will further be seen that as said mud guard is raised the same will be disposed outwardly so as to be entirely cleared of the side lamps 18 carried on the body of the vehicle, as particularly shown in dotted lines in Fig. 2. When the mud guard is disposed in its raised position, it will be appreciated that ready access may be had to the engine and in order to provide means for the support of the guard in its raised position, the section 5 of the hinge which is mounted on the running board 4 is provided with lugs 19 upon which the lower portion of said mud guard is adapted to rest when turned upwardly, as shown in dotted lines in Fig. 1.

It is a well known fact among automobilists that considerable difficulty is experienced when desiring to operate upon the engine, in view of the securing of the mud guard in position on the vehicle, in fact, when any great amount of work is necessary upon the engine, the mud guard must be totally removed, which requires considerable time and trouble. When only light work is necessary on the engine, the mud guards are usually allowed to remain in position and the tools and instruments used by the mechanician are often placed upon the mud guard, thereby removing the paint from the same. With my improvement applied to use, however, it will be seen that these many difficulties will be obviated as it will only be necessary to disengage the forward portion of the mud guard from the frame and raise the same, as shown in the drawing, when desiring to have access to the engine. I have stated particularly that this hinged mud guard will permit ready access to the engine, but it will also be appreciated that the same will also permit ready access to the wheels and tires thereon, which need constant attention, and while I have only shown a single mud guard in connection with the forward wheel of the vehicle, it will also be understood that a guard of this type is equally well adapted for use in connection with the rear wheels of the vehicle.

From the foregoing, it will be seen that I have provided a simple, inexpensive and efficient mud guard for vehicles, particularly automobiles, which is hingedly mounted on the running board at an angle to the horizontal plane of the latter whereby the same will be disposed outwardly as it is raised.

While I have particularly described the elements most well adapted to perform the functions set forth, it is obvious that various changes in form, proportion, and in the minor details of construction may be resorted to for successfully carrying my invention into practice without departing from the spirit or sacrificing any of the principles thereof.

Having thus described this invention, what I claim is:—

1. The combination with a vehicle step; of a mud guard, a hinge securing the mud guard to said step, the axis of which is disposed at an angle to the horizontal plane of said step, and means to support said mud guard on the frame of the vehicle.

2. The combination with a vehicle step; of a mud guard, hingedly mounted thereto, means to support the mud guard in its lowered position on the frame of the vehicle, and means carried on the step adapted to support the mud guard in its raised position.

3. The combination with a vehicle step; of a mud guard, a hinge securing the mud guard to said step, the axis of which is disposed at an angle to the horizontal plane of said step, means to support the mud guard in its lowered position on the frame of the vehicle, and additional means carried by the hinge to support the mud guard in its raised position.

4. The combination with a vehicle frame and a step thereon; of a mud guard, a hinge securing said mud guard to the step, the knuckle of said hinge having the inner end thereof raised in a plane above the plane of the outer end to dispose said guard outwardly from the frame as the same is swung on said hinge, means to support the forward end of said mud guard on the frame when the same is in its lowered position, and means to support the guard in its raised position.

In testimony whereof I hereunto affix my signature in the presence of two witnesses.

OLIVER W. PATTERSON.

Witnesses:
CHARLES E. SNOW,
WALTER A. PARRISH.